US010809688B2

(12) United States Patent
Drouot et al.

(10) Patent No.: US 10,809,688 B2
(45) Date of Patent: Oct. 20, 2020

(54) CONTROL ARCHITECTURE INCLUDING A PROGRAMMABLE LOGIC CONTROLLER AND A CLOUD COMPUTING SYSTEM

(71) Applicant: Schneider Electric Industries SAS, Rueil Malmaison (FR)

(72) Inventors: Yves Drouot, Saint Laurent du Var (FR); Francois Gorisse, Mougins (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 15/287,498

(22) Filed: Oct. 6, 2016

(65) Prior Publication Data

US 2017/0108844 A1  Apr. 20, 2017

(30) Foreign Application Priority Data

Oct. 14, 2015  (FR) .................................... 15 59776

(51) Int. Cl.
*G05B 19/05* (2006.01)
*G05B 19/418* (2006.01)
*H04L 29/08* (2006.01)

(52) U.S. Cl.
CPC ......... *G05B 19/05* (2013.01); *G05B 19/4185* (2013.01); *H04L 67/02* (2013.01); *H04L 67/12* (2013.01); *G05B 2219/14083* (2013.01); *G05B 2219/25168* (2013.01); *Y02P 90/86* (2015.11)

(58) Field of Classification Search
CPC ....................... G05B 19/05; G05B 2219/14083
See application file for complete search history.

(56) References Cited

U.S. PATENT DOCUMENTS

2013/0211546 A1* 8/2013 Lawson ............. G05B 19/4185
700/9
2013/0211555 A1 8/2013 Lawson et al.
2013/0212129 A1 8/2013 Lawson et al.
(Continued)

FOREIGN PATENT DOCUMENTS

CN  103930870 A  7/2014

OTHER PUBLICATIONS

PLCdev, plcdev.com, Nov. 8, 2007 (accessed from <<https://web.archive.org/web/20071108234041/http://www.plcdev.com/an_introduction_to_rslogix5000_tags>> on Aug. 21, 2018) (Year: 2007).*
(Continued)

*Primary Examiner* — Michael J Huntley
(74) *Attorney, Agent, or Firm* — Oblon, McClelland, Maier & Neustadt, L.L.P.

(57) ABSTRACT

A control architecture includes at least one programmable logic controller and at least one cloud computing system. An automation program of the controller includes at least one predefined control module. The cloud computing system is designed to store first data in accordance with a model of input data and second data in accordance with a model of output data. At least one first hardware and/or software entity is designed to publish the first data in the cloud computing system with a view to being read by the programmable logic controller when it executes the predefined control module. At least one second hardware and/or software entity is designed to read the second data published in the cloud computing system by the programmable logic controller when it executes the predefined control module.

9 Claims, 3 Drawing Sheets

(56) References Cited

U.S. PATENT DOCUMENTS

| | | | |
|---|---|---|---|
| 2013/0212160 A1 | 8/2013 | Lawson et al. | |
| 2013/0212420 A1 | 8/2013 | Lawson et al. | |
| 2014/0324278 A1* | 10/2014 | Teng | G07C 5/008 |
| | | | 701/31.5 |
| 2014/0336785 A1* | 11/2014 | Asenjo | G05B 19/4185 |
| | | | 700/17 |
| 2015/0277406 A1* | 10/2015 | Maturana | G06F 9/451 |
| | | | 700/83 |
| 2015/0341469 A1* | 11/2015 | Lawson | G05B 19/4185 |
| | | | 709/203 |
| 2016/0285708 A1* | 9/2016 | Papadopoulos | H04L 67/10 |
| 2017/0017220 A1* | 1/2017 | Keitel | G05B 19/05 |
| 2017/0208426 A1* | 7/2017 | Komoni | H04W 4/008 |
| 2017/0331906 A1* | 11/2017 | Choi | H04L 67/16 |

OTHER PUBLICATIONS

French Preliminary Search Report dated May 9, 2016 in French application 15 59776 filed on Oct. 14, 2015 (with English Translation of Categories of Cited Documents and Written Opinion).

R. Langmann et al., "Automation services from the cloud, New Trends in Process Control Technology", 2014 $11^{th}$ International Conference on Remote Engineering and Virtual Instrument (REV), IEEE, Feb. 2014, pp. 6.

Search Report dated Nov. 20, 2018, in Chinese Patent Application No. 2016108420838 (w/ English-language translation).

\* cited by examiner

CONTROL ARCHITECTURE INCLUDING A PROGRAMMABLE LOGIC CONTROLLER AND A CLOUD COMPUTING SYSTEM

TECHNICAL FIELD OF THE INVENTION

The present invention pertains to a control architecture employing in particular a programmable logic controller and a cloud computing system.

PRIOR ART

In a known manner, a programmable logic controller (PLC) is tasked with executing its own automation program in such a way as to drive a set of input/output modules. The programmable logic controller reads data sensed on the input modules and writes data to the output modules. The input modules are for example hooked up to sensors and the output modules are for example hooked up to actuators.

At present, various architectures are possible:

The input/output modules may be local and connected directly to the central unit module of the programmable logic controller via a backplane bus, The input/output modules may be sited elsewhere in islets installed as close as possible to the sensors and actuators and are connected to the central unit module of the programmable logic controller through the dedicated communication interfaces.

However, for certain applications, neither of these two architectures is necessarily appropriate. Such is for example the case in architectures where the sensor connected to an input module or the actuator connected to an output module is not situated in a directly accessible place. In these applications, it is not always convenient to hook the input/output modules up to the sensors and/or actuators concerned in the application.

A solution which makes it possible to manage these sensors and/or actuators with the aid of a conventional programmable logic controller is then necessary.

Moreover, it would be desirable to be able to configure such an application easily, without having to modify the automation program which is executed in the programmable logic controller.

Patent application US2013/211546A1 moreover describes the use of devices making it possible to endow automation equipment with a capability of communication and exchange with a cloud computing system so that data generated by the automation equipment are rendered available in the cloud computing system, for example for computer clients.

The aim of the invention is therefore to propose a control architecture which comprises a programmable logic controller which makes it possible to manage sensors and/or actuators easily, even if the latter are situated in places that are not directly accessible and which can easily control an application, without having to modify its program.

DISCLOSURE OF THE INVENTION

This aim is achieved by a control architecture comprising:
at least one programmable logic controller comprising an automation program,
at least one cloud computing system comprising an address accessible through a communication network, the automation application comprising at least one control module designed to control an application by consuming input data in accordance with a model of input data and by determining output data in accordance with a model of output data,
the cloud computing system being designed to store first data in accordance with the model of input data of the control module and second data in accordance with the model of output data of the control module,
at least one first entity being connected to the cloud computing system and designed to publish said first data in the cloud computing system in order to being read by the programmable logic controller when it executes the control module,
at least one second entity being connected to the cloud computing system and designed to read said second data published in the cloud computing system by the programmable logic controller when it executes said control module.

According to a particular feature, the first entity is a sensor.

According to another particular feature, the first entity is a server intended to publish its data.

According to another particular feature, the second entity is an actuator.

According to another particular feature, the second entity is a server making available the data read on the cloud computing system.

According to another particular feature, the cloud computing system is identified on the communication network by an address of IP type or a URL.

According to another particular feature, the control architecture operates according to a protocol of MQTT or AMQP type.

According to another particular feature, the architecture also comprises a configuration computing system designed to associate each input datum and each output datum of the control module with a storage location present in the cloud computing system.

BRIEF DESCRIPTION OF THE FIGURES

Other characteristics and advantages will become apparent in the detailed description which follows in conjunction with the appended drawings in which.

DETAILED DESCRIPTION OF AT LEAST ONE EMBODIMENT

Figure 1:
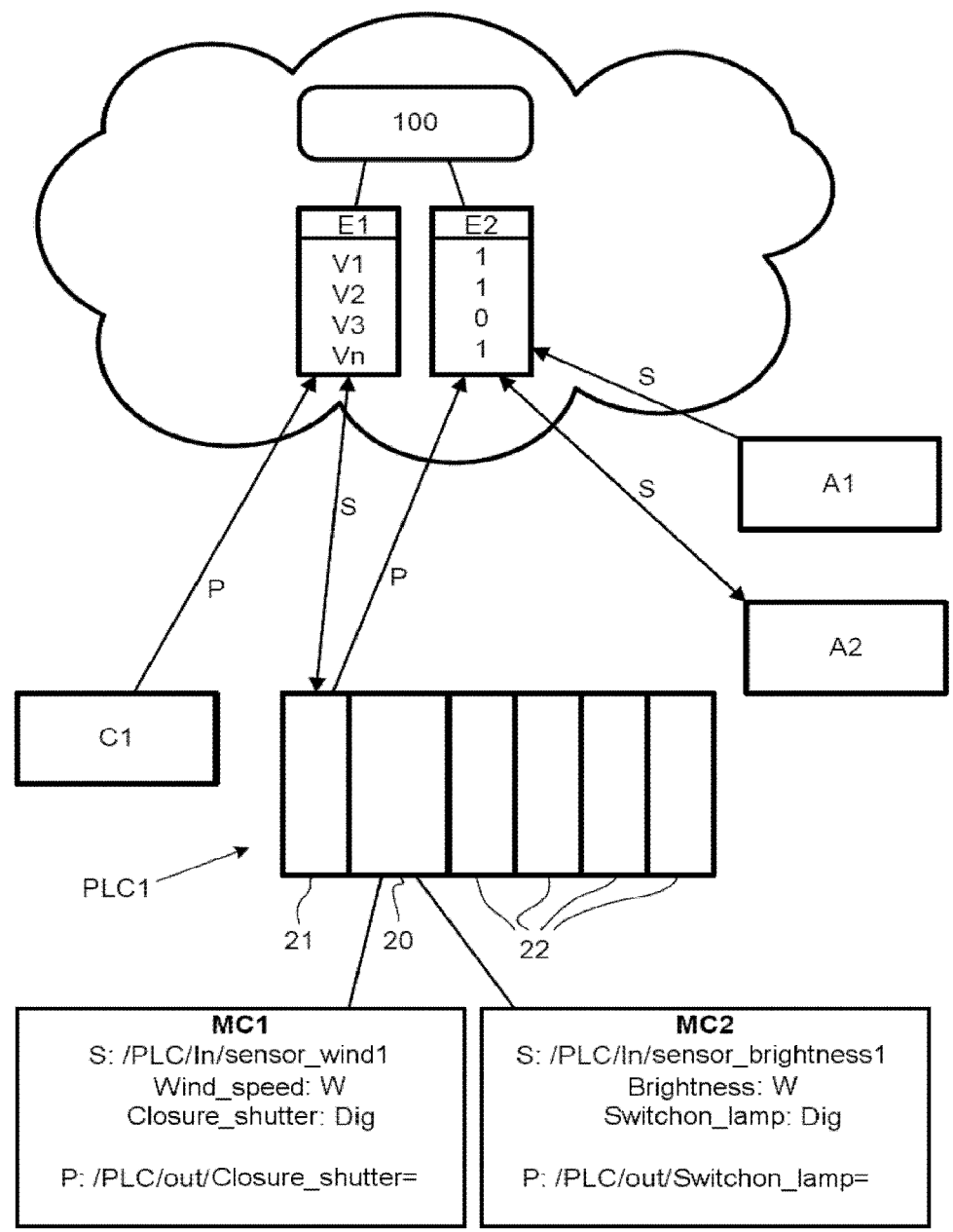
FIG. 1 represents in a schematic manner the control architecture of the invention.

The invention is aimed at proposing a novel control architecture including in particular a programmable logic controller PLC1 and a cloud computing system 100 to which the programmable logic controller PLC1 connects.

The programmable logic controller PLC1 comprises at least one central unit module 20 intended to execute an automation program and at least one communication module 21 comprising a communication interface adapted for connecting to the cloud computing system using a communication protocol. In the figures, the programmable logic controller is represented with one or more input/output modules 22 connected to the central unit through a backplane bus. These modules 22 do not enter into the framework of the invention again.

According to the invention, the automation program can comprise one or more predefined control modules MC1, MC2. Each control module allows the control of a dedicated application, for example a management application in respect of wind (MC1), temperature or brightness (MC2). A wind management application can consist in measuring the wind speed and in controlling closure of one or more shutters according to the wind speed level. The brightness management application can consist in controlling a lampstand when the brightness becomes too low.

Each predefined control module is thus designed to consume input data, for example data in respect of speed, brightness or temperature level, and to determine output data, for example shutter, lampstand or air-conditioning control data.

According to the invention, the input data are defined according to a model of input data and the output data are defined according to a model of output data. The model of input data comprises at least the type of variable recognized for the execution of the predefined control module. The model of output data comprises at least the type of variable determined during the execution of the predefined control module. Type of variable is understood to mean thus for example the Boolean type, character string, but also the digital or analogue nature of the data of the model. In the modules MC1, MC2 represented in FIG. 1, the input data are for example character strings (W) and the output data are of digital type (Dig).

The cloud computing system comprises an address, for example an address of IP ("Internet Protocol") type, or of URL ("Uniform Resource Locator") type so as to be able to communicate with the programmable logic controller PLC1, through a communication network. The communication of the programmable logic controller PLC1 with the cloud computing system 100 is carried out through the communication module 21 of the controller.

The cloud computing system 100 is designed to create storage spaces E1, E2 to share data between publishers and subscribers (or consumers) of data.

According to the invention, the architecture also comprises a configuration computing system (not represented) designed to associate each predefined control module with the IP address of the cloud computing system 100.

The configuration computing system is also designed to associate each input datum of a predefined control module with a first storage location E1 present in the cloud computing system 100 and each output datum of a predefined control module with a second storage location E2 present in the cloud computing system 100.

Each predefined control module MC1, MC2 will also be able to be configured by defining the data exchange frequency at which the programmable logic controller PLC1 publishes its output data in the second storage location of the cloud computing system 100.

The control architecture also comprises at least one first hardware and/or software entity, for example a sensor C1, designed to publish data (V1-Vn—publication operation designated by the letter P in the appended figures) in the cloud computing system 100. According to the invention, this first hardware and/or software entity is configured to publish these data in the first storage location E1.

The control architecture also comprises at least one second hardware and/or software entity, for example an actuator A1, designed to read data in the cloud computing system 100. According to the invention, this second hardware and/or software entity is configured to read the data published in the second storage location E2 (subscription operation designated by the letter S in the appended figures).

According to the invention, the link between the programmable logic controller PLC1 and the cloud computing system 100 can be effected through a suitably adapted communication relay.

Likewise, the first hardware and/or software entity and/or the second hardware and/or software entity may be obliged to communicate with the cloud computing system 100 through a suitably adapted communication relay. According to its use, the relay will then be configured to publish data or subscribe to data present in the cloud computing system 100.

In the subsequent description, we take the example of a wind management module involving a first hardware and/or software entity of anemometer sensor type and a second hardware and/or software entity of window-shutter-actuator type.

In FIG. 1, the sensor C1 is designed to publish data (V1-Vn) in a first storage location E1 of the cloud computing system 100, defined by the following path: /PLC/In/sensor_wind1

The actuator A1 is configured to subscribe to the data published in a second storage location E2 of the cloud computing system 100, defined by the following path: /PLC/out/closure_shutter For the wind management application, the programmable logic controller PLC1 comprises a predefined control module MC1 which is configured to connect to the IP address of the cloud computing system 100 and which is configured so as to:

subscribe to the data published in the first storage location E1 of the addressed cloud computing system 100, by following an instruction of subscription (S) to the data located by the path: /PLC/In/sensor_wind1 publish (P) its output data in the second storage location E2 of the addressed cloud computing system 100, by writing the output datum by following the path: /PLC/out/closure_shutter During the execution of the wind management control module, the programmable logic controller PLC1 is thus obliged to read (S), as input data, the data present in the first storage location E1 of the addressed cloud computing system and to publish (P) its output data in the second storage location E2 of the addressed cloud computing system 100.

Figure 2:
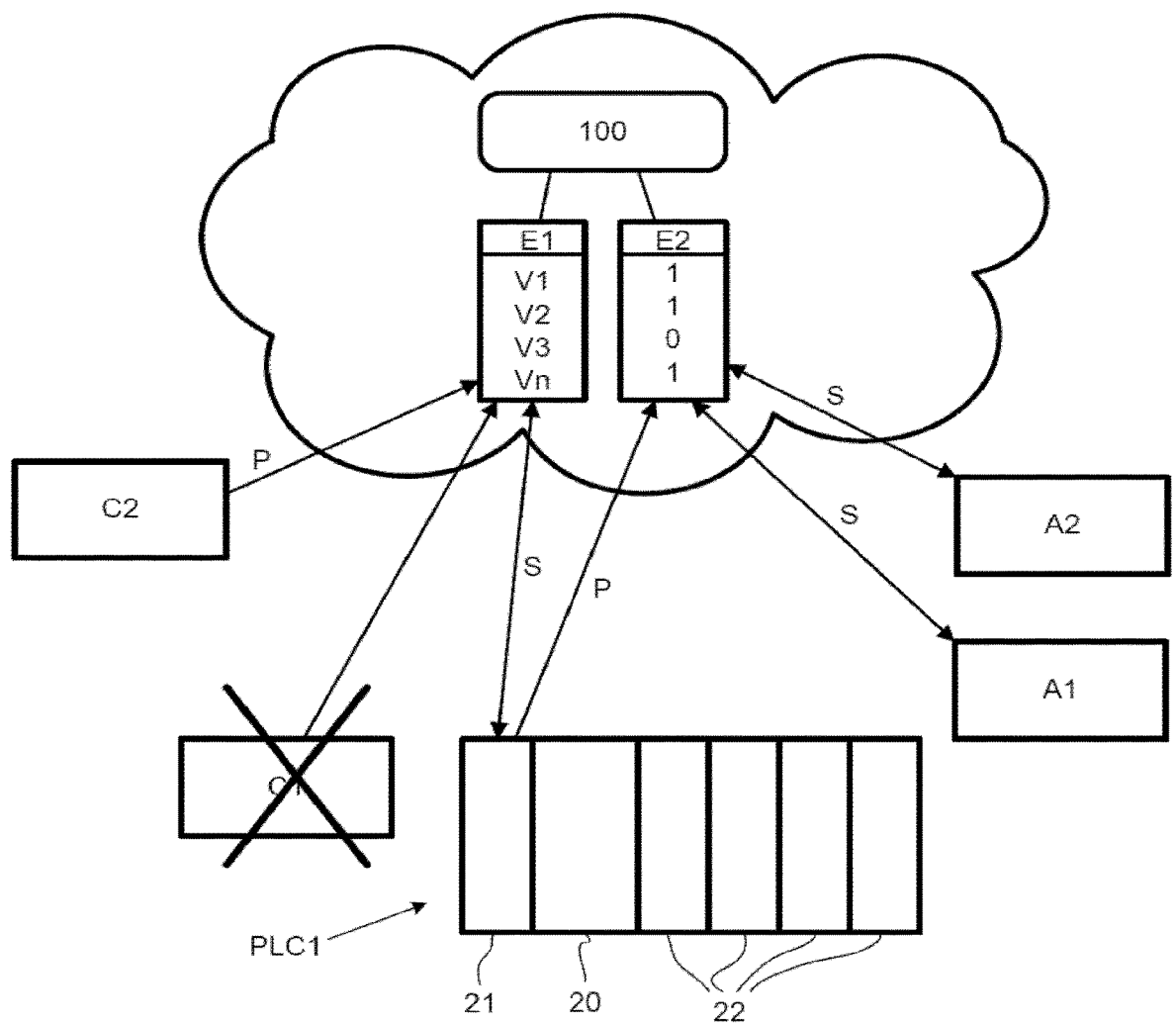
FIG. 2 illustrates in a schematic manner a benefit of the architecture of the invention.

The solution of the invention makes it possible to decorrelate the automation program executed in the programmable logic controller PLC1 from the sensors and actuators employed. By virtue of the architecture of the invention, the programmable logic controller PLC1 executes the automation program without knowing the provenance of its input data, or the destination of its output data. By virtue of the invention, as represented in FIG. 2, it is for example possible to replace a sensor C1 with another sensor C2 without modifying the automation program. Accordingly, it suffices to configure the new sensor C2 so that it publishes (P) its data in the first storage location E1 of the cloud computing system. Likewise, it is for example possible to add actuators to be controlled. Accordingly, it suffices that each new actuator to be controlled subscribe to the data published in the second storage location of the cloud computing system.

Figure 3:
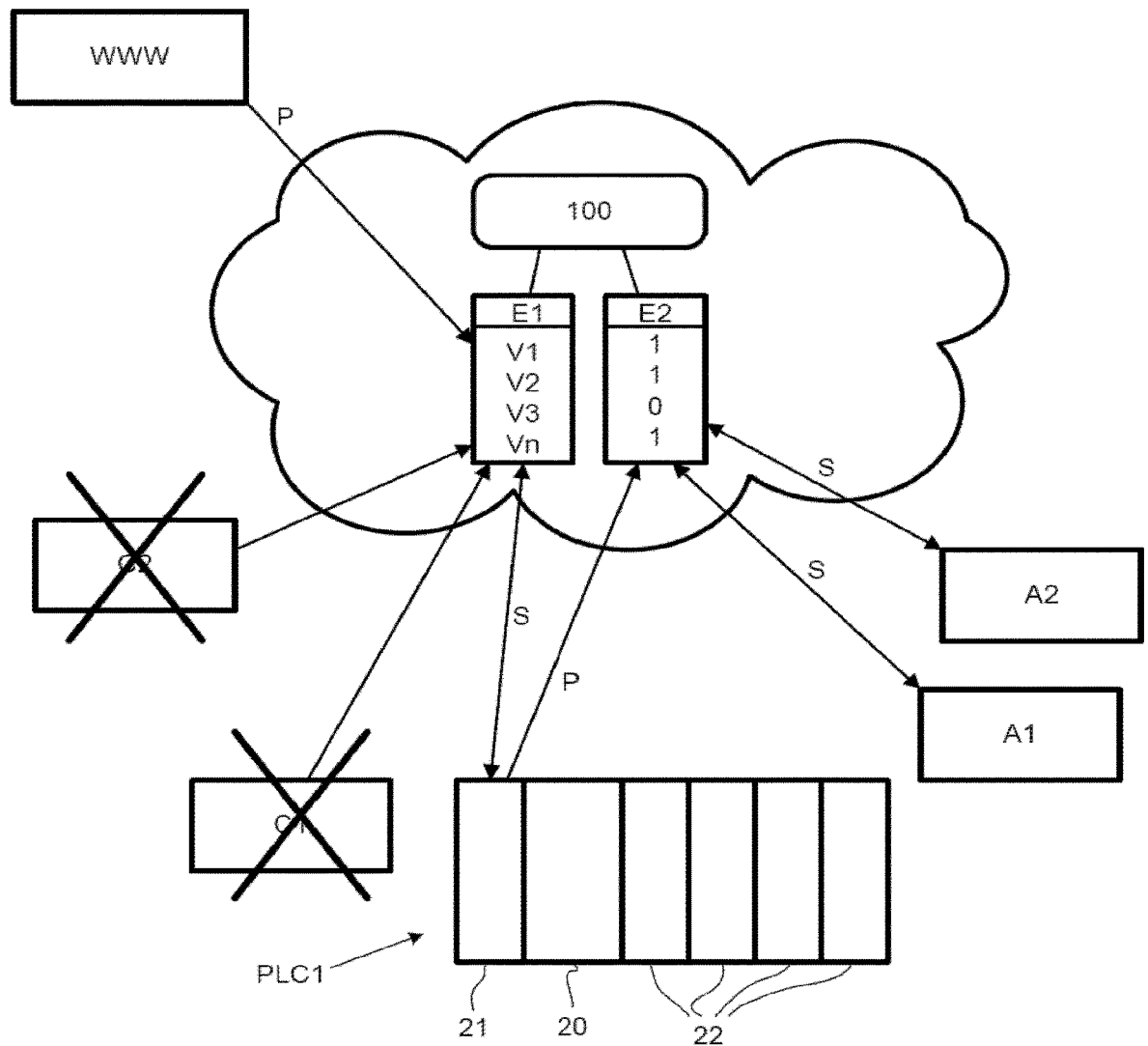
FIG. 3 illustrates in a schematic manner another aspect of the architecture of the invention.

Furthermore, as already specified and as represented in FIG. 3, the first entity or the second entity described hereinabove may be of software type. It may be for example a weather server (WWW) gathering weather data and able to publish some of these data in the first storage location E1 of the cloud computing system 100. In this situation, the sensors C1 and C2 are replaced with the weather server WWW which publishes its data in the cloud computing system.

Likewise, without providing a more thorough description, the actuator A1 and/or the actuator A2 could be replaced with another actuator or with a server making the data available.

According to the invention, it is thus possible to envisage several control modules predefined in the automation program and to link the sensors and actuators associated with the control modules to be executed subsequently.

Advantageously, the control architecture of the invention may be implemented by employing a protocol of MQTT (for "Message Queuing Telemetry Transport") or AMQP (for "Advanced Message Queuing Protocol") type.

According to the invention, if no physical sensor or physical actuator is associated with the control module executed, the data published in the first location E1 and read in the second location E2 may be so handled by a simulation interface. This simulation interface will for example be able to make it possible to test the architecture and the execution of the automation program.

Moreover, the cloud computing system can comprise a program for performing analyses on the data which flow, in particular to afford access to predictive maintenance services.

The invention claimed is:

1. A control architecture comprising:
   at least one programmable logic controller comprising an automation program,
   at least one cloud computing system comprising an address accessible through a communication network, wherein:
   the automation program comprises at least one control module designed to control an application by processing input data in accordance with a type of input data which is one of a plurality of types of input data compatible with the control module and by determining output data in accordance with a type of output data which is one of a plurality of types of output data outputable by the control module,
   the at least one cloud computing system is designed to store first data in accordance with the type of input data of the control module and second data in accordance with the type of output data of the control module, the first data being stored in a first location independently from the second data stored in a second location,
   at least one first data generating device is connected to the at least one cloud computing system and is configured to submit said first data to the at least one cloud computing system such that it is accessible by the at least one programmable logic controller when the at least one programmable logic controller executes the at least one control module,
   the at least one programmable logic controller is configured to, in response to the at least one programmable logic controller executing the at least one control module, (i) subscribe, via an instruction sent to the at least one cloud computing system, to the first location in the at least one cloud computing system to access the first data and (ii) submit, based on the first data, the second data to the at least one cloud computing system,
   at least one second data reading device is connected to the at least one cloud computing system and is configured to (i) subscribe, via an instruction sent to the at least one cloud computing system, to the second location in the at least one cloud computing system and (ii) read said second data submitted to the at least one cloud computing system by the at least one programmable logic controller, and
   wherein the type of input data includes at least a type of variable recognized in the execution of the control module and the type of output data includes at least a type of variable generated by the execution of the control module.

2. The control architecture according to claim 1, wherein the at least one first data generating device is a sensor.

3. The control architecture according to claim 1, wherein the at least one first data generating device is a server.

4. The control architecture according to claim 1, wherein the at least one second data reading device is an actuator.

5. The control architecture according to claim 1, wherein the at least one second data reading device is a server making available data read on the at least one cloud computing system.

6. The control architecture according to claim 1, wherein the at least one cloud computing system is identified on the communication network by an address of IP type or a URL.

7. The control architecture according to claim 1, wherein the control architecture operates according to a protocol of Message Queuing Telemetry Transport ("MQTT") or Advanced Message Queuing Protocol ("AMQP") type.

8. The control architecture according to claim 1, further comprising: a configuration computing system configured to associate each input datum and each output datum of the at least one control module with a storage location present in the at least one cloud computing system.

9. The control architecture according to claim 1, wherein the type of input data is different from the type of output data.

* * * * *